March 27, 1956  R. A. OSWALD  2,739,866
METHOD AND APPARATUS FOR PHOTOGRAPHING RACES, OR THE LIKE
Filed Oct. 20, 1947  2 Sheets-Sheet 1
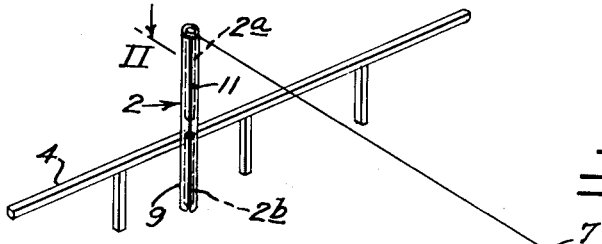
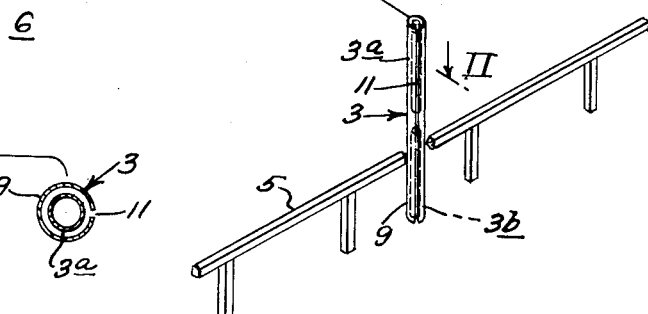
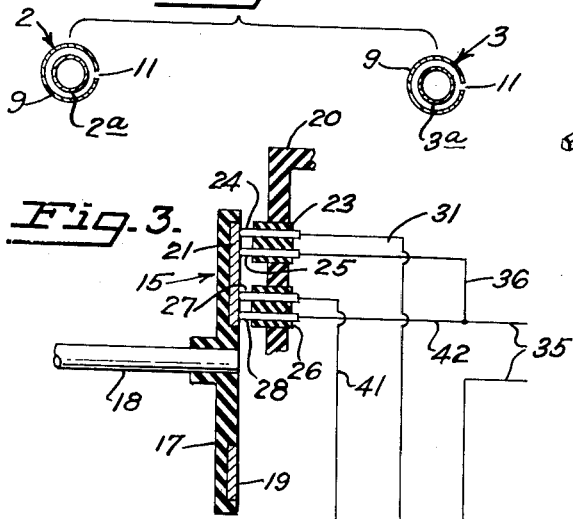
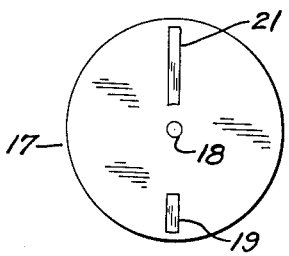
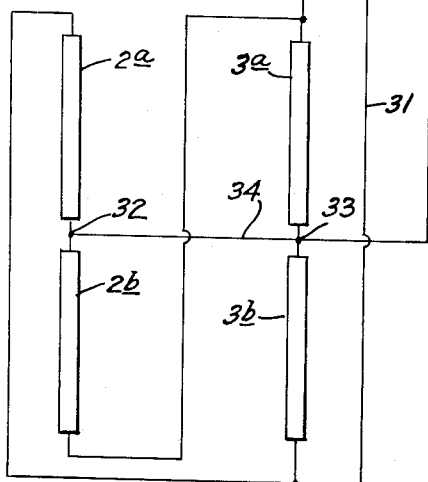
INVENTOR.
ROBERT A. OSWALD
BY Stephen S. Townsend
ATTORNEY.

March 27, 1956 R. A. OSWALD 2,739,866
METHOD AND APPARATUS FOR PHOTOGRAPHING RACES, OR THE LIKE
Filed Oct. 20, 1947 2 Sheets-Sheet 2
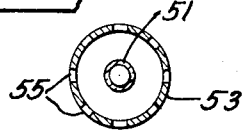
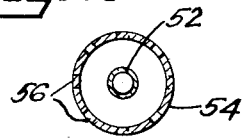
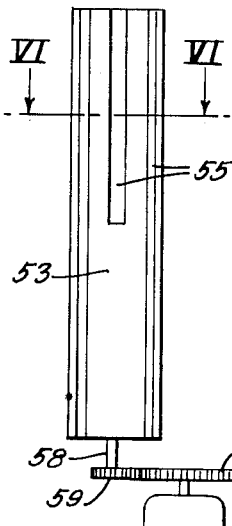
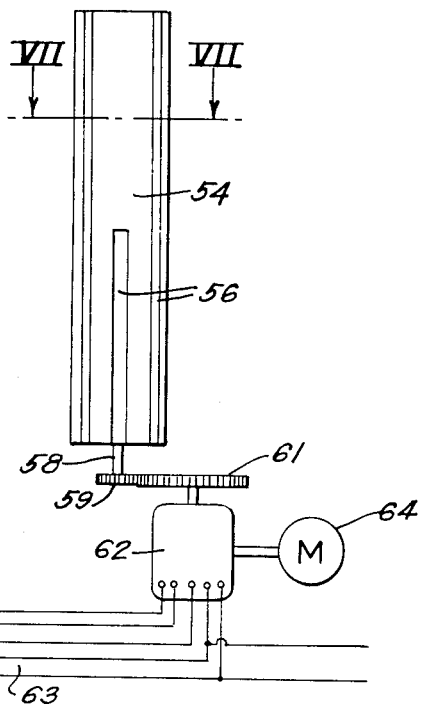
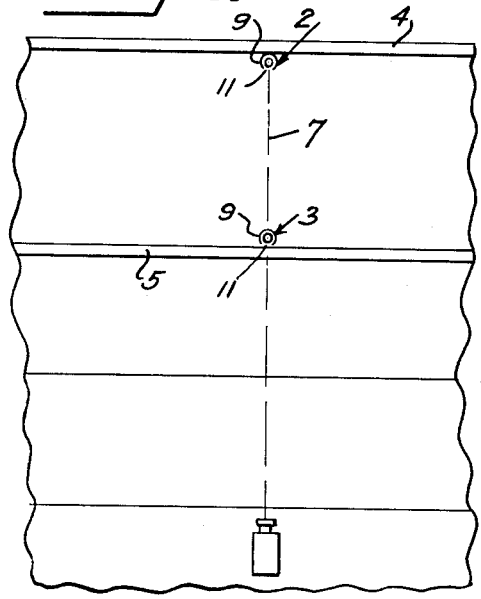
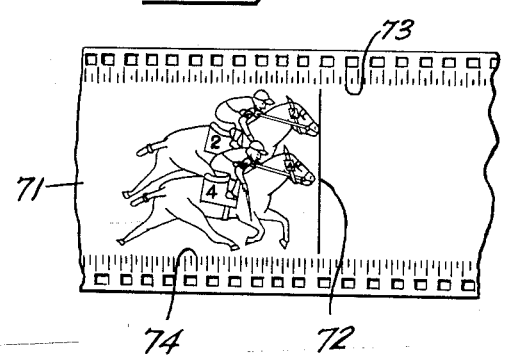
INVENTOR.
ROBERT A. OSWALD
BY Stephen S. Townsend
ATTORNEY

United States Patent Office 2,739,866
Patented Mar. 27, 1956

2,739,866

METHOD AND APPARATUS FOR PHOTOGRAPHING RACES OR THE LIKE

Robert A. Oswald, San Mateo, Calif.

Application October 20, 1947, Serial No. 780,840

5 Claims. (Cl. 346—107)

This invention relates to a photographic method and apparatus, and, more particularly, to a method and apparatus for obtaining a photographic record of contestants crossing a designated finish line in the sequence of crossing, as well as a method and apparatus for obtaining a calibrated film strip showing the time lapse between contestants crossing a designated finish line or locale.

It is common practice to record photographically the finish of horse races, dog races, and other similar sport events, in order to determine accurately the order of finish of contestants, as well as the time interval lapsing between contestants as they cross a designated finish line. The method of photographing races in the manner mentioned is known as "photo finish" photography.

The usual method employed is to position a camera to one side of the track and above the track, and in optical alignment with the finish line. The camera is of a so-called continuous strip type, provided with a slit mask to define a uniform field which runs transversely across the race track at the finish line. The optical field of the camera at the finish line may be only an inch or two in width in order to photograph only a very small part of the track at the finish line. The film, such as a 35 mm. motion picture film, is fed by suitable motor control means through the camera continuously behind the slit at a speed relative to the speed of the moving object photographed, the focal length of the lens employed and the distance of the lens from the moving object photographed. The ratio of speed of the film and moving object photographed should be substantially equal to the ratio between the distance of the lens from the object to its focal length.

In operation, a target is affixed on the track in alignment with the camera and which said target is provided with a marker point in direct alignment with the finish point of the race and the slit is aligned with the finish line and target. The film, upon exposure, is a continuous strip, showing each contestant crossing the finish line in the sequence of actual entry into the field of the camera, namely, a transverse, narrow strip across the track. The continuous strip of film, showing the various contestants crossing the finish line, is developed and then a hair line is positioned over the enlarging paper at right angles to the edges of the film strip to be printed. Then the operator, viewing the film strip from above, moves the film strip into position relative to the hair line on the enlarging paper and when an image of a contestant is seen to contact the hair line the operator thus identifies the winner and the film is printed.

In practice, an enlargement of the negative is developed at the point of first superposed contact of the hair line with a contestant in question, and, during the course of development, the said hair line throws a shadow transversely across the projected film strip (track) which identifies the finish line. Thus, there is no real finish line photographed in a racing event and no finish wire is actually a part of the photographed record, but must be supplied to the projected enlargement of the strip of film after completion of the racing event.

Many times racing contestants cross the finish line in what looks to the naked eye to be a "dead heat." The operator of the "photo finish" camera may honestly position the hair line relative to the film in what he thinks to be a position at absolutely right angles to the edges of the film strip but which, in fact, might be canted. This superposed contact of the hair line relative to the contestants may favor a contestant on the inside of the track or, if canted in the opposite direction, may favor the contestant on the outside of the track. It has been found by experiment that minute normally indiscernible variations in positioning of the hair line relative to the film strip will cause two contestants to appear to be absolutely in a "dead heat," or, alternatively, that either of the contestants was the winner.

Further, the photo finish technician is many times unable properly to align the camera with the finish line because the target, usually a single rather large, wide marker, such as a post adjacent to the inner rail, does not offer a means of sighting the slit of the camera in exact optical alignment with the finish line. If the camera is not properly and accurately sighted the resultant photographic record is, obviously, inaccurate with respect to the position of the finish line, namely, a line drawn transversely of the track exactly normal to the track at the finish point.

It is a prime object of the present invention to provide a calibration on the film strip which will enable the photo finish technician to position the hair line at exact right angles to the film strip, thereby obviating possibility of error.

At the present time, even with a target on the track with which the hair line may be superposed, the said target marker only projects into the lens field on one side of the film strip and there is, therefore, nothing to align the straight line marker of the target with the other side of the film strip in positioning the hair line. It is thus an object of the present invention to provide a film strip having projected aligned indicia on opposite sides of the film strip, whereby the said indicia serve as markers or guides in the positioning of the hair line at right angles to the edges of the film strip and, therefore, at right angles to the longitudinal axis of the track at the position of the finish line.

A further advantage of this invention is to enable the photo finish camera technician to align accurately the masking slit of the camera with the signal devices prior to commencement of a photographic record and, therefore, enables exact optical alignment of the camera with the finish line.

It is a further object of the present invention to provide a film strip provided with indicia along opposite edges thereof at spaced intervals to serve as calibrations to determine the time interval between contestants passing a finish line or any other designated locale, such as, for example, the sixteenth mile posts on a horse track, in order to determine accurately the time and relative speed of each contestant passing a designated point.

General advantages flowing from the present invention are numerous, such as ease in policing photographic operations at race tracks or the like, accuracy in determining time intervals between race contestants and in determining time lapse between any photographed objects or persons passing a designated locale, accuracy in determining positions of contestants crossing a given "line," and many other advantages which will become apparent upon referring to the specification and accompanying drawings in which similar characters of reference represent corresponding parts in the several views.

Referring to the drawings:

Fig. 1 is a perspective view of the finish line of a race track, showing the installation of the invention and the signal shields shown in broken lines.

Fig. 2 is an enlarged sectional view, taken on line II—II of Fig. 1.

Fig. 3 is a circuit diagram of a preferred form of apparatus constructed in accordance with the invention.

Fig. 4 is a face view of a rotating switch contact disk employed in the apparatus shown in Fig. 3.

Fig. 5 is a wiring diagram and side elevational view of a modification of the invention.

Fig. 6 is a sectional view taken on line VI—VI of Fig. 5.

Fig. 7 is a sectional view taken on line VII—VII of Fig. 5.

Fig. 8 is an enlarged top plan view showing the relative arrangement of camera and finish line.

Fig. 9 is a fragmentary plan view of a strip of film after printing, showing the improved calibrations thereupon.

The invention comprises, essentially, the provision of visual signals on opposite sides of a race track, in alignment with one another and the finish line, and whereby the said visual signals are reproduced on the film utilized in a photo finish camera. Preferably, the signals disposed on opposite sides of the track produce two different signals synchronously, so that, for example, a long signal is reproduced by each signal device synchronously and then a short signal, so that on the developed film strip a long signal will appear on one side of the film strip directly opposite another long signal on the opposite side of the film strip; and, similarly, a short signal on one side would be directly opposite a short signal on the opposite side of the film strip. Hence, when the finish wire hair line is superposed over the enlargement paper the said hair line may be lined up relative to the film strip by means of the long and short signals appearing opposite to one another on the film strip in order to insure an absolute right angular position of the hair line relative to the edges of the strip which, of course, is a reproduction of the race track at the finish line.

In order to carry out the invention, I prefer to provide visual signal devices, generally indicated at 2 and 3, adjacent to the inner and outer rails 4 and 5 of the racing strip, indicated generally at 6. The signal devices 2 and 3 are in direct alignment with one another and the finish line, indicated by means of a wire, as at 7. It has previously been noted that the wire 7 is not reproduced in the finished picture.

As indicated in the structure represented in Figs. 1, 2 and 3, each of the signal devices 2 and 3 comprises, respectively, a pair of vertically aligned superposed electric illuminating tubes, indicated at $2^a$, $2^b$ and $3^a$, $3^b$. Each pair of tubes $2^a$, $2^b$ and $3^a$, $3^b$ is enclosed in a tubular masking member 9 provided with a longitudinal slit 11. The slits 11 of the respective signal devices 2 and 3 are in direct alignment with each other and the finish wire 7 so that light, visible through the said slits, identifies the point of the finish line. The slit in signal 2 faces toward the camera lens and toward the center of the track, whereas the slit 11 in signal 3 faces toward the camera but away from the center of the track. Preferably, the bottom tube $2^b$, adjacent to the inner rail 4, and top tube $3^a$, adjacent to the outer rail 5, are connected in parallel with one another and are actuated through a suitable switch mechanism, generally indicated at 15. Similarly, the top tube $2^a$ and bottom tube $3^b$ are connected in parallel with one another and are actuated through the said switch mechanism 15.

The switch mechanism comprises a disk 17, mounted on a shaft 18 adapted to revolve by means of a suitable motor (not shown). The disk 17 carries a small contact electrode 19 and a large contact electrode 21, 180° oppositely disposed to one another.

A contact holder 23 is provided with contacts 24 and 25 which are spring urged (not shown) against the electrode carrying face of disk 17 and spaced therefrom is a contact carrier 26 provided with contacts 27 and 28 which are spring urged (not shown) against the electrode carrying face of disk 17. Contact carriers 23 and 26 are supported by a rigid base member 29 so that the said carriers are stationary while the disk 17 revolves to bring the large electrode 21 and small electrode 19 into contact with the respective contacts of carriers 23 and 26.

The contacts 24 and 25 are adapted to contact electrodes 21 and 19 while contacts 27 and 28 are arranged to contact electrode 21 only during revolution of the disk 17. Therefore, as the disk 17 revolves, contacts 24 and 25 will actuate a circuit connected thereto twice during one revolution of the disk, whereas contacts 27 and 28 will actuate their respective circuits only once during a single revolution of the disk 17. It is obvious that a number of different switch mechanisms may be employed to actuate the respective circuits connected to the contact carriers 23 and 26 in the manner indicated.

Connected to contact 24 is a line 31, which, in turn, leads to and is operatively connected to tubes $3^b$ and $2^a$. Tubes $2^a$ and $2^b$ are connected together, as at 32. Similarly tubes $3^a$, $3^b$ are connected together, as at 33. A line 34 connects lines 32 and 33 together and leads to one side of a suitable power source line 35. Connected to contact 25 is a line 36 which leads to the other side of power source line 35. Thus contacts 24 and 25, upon contact with either electrode 21 or 19, close the circuit to illuminate the electrical tubes $2^a$ and $3^b$.

For purposes of convenience, the circuit just described shall be generally designated as the "short signal circuit." The term "short signal circuit" is used to indicate that only one tube of each pair of tubes comprising signals 2 and 3 is actuated and that they are actuated twice for each revolution of the disk 17.

Connected to contact 27 is a line 41 which is operatively connected to tubes $3^a$ and $2^b$. Connected to contact 28 is a line 42 which is connected to one side of the electrical power source lines 35. Thus when the contacts 27 and 28 contact electrode 21, the circuit, actuating tubes $3^a$ and $2^b$, is closed. Illuminating tubes $2^b$ and $3^a$ are illuminated during the period of electrical contact of contacts 27 and 28 with electrode 21.

For purposes of convenience, the circuit just described will be referred to as the "long signal circuit" inasmuch as both tubes of both signal devices 2 and 3 are illuminated synchronously when the contacts 24, 25 and 27, 28 contact electrode 21.

It is thus seen that as disk 17 revolves, both pairs of tubes of signal devices 2 and 3 are illuminated simultaneously, while during the same revolution of the disk 17 one tube of signal device 2 and another tube of signal device 3 are illuminated simultaneously. Thus when a continuous picture is made of the finish line of a race track or the like, alternately long and short signals will appear projected onto the opposite edges of the film strip, a long signal representing illumination of both tubes in the signal devices, and a short signal representing illumination of only a single tube in signal devices 2 and 3. The short signals, because of the electrical circuit herein described, or any other circuit which would accomplish the same result, are opposite a short signal on the other side of the track (or recorded on film strip) while similarly a long signal is disposed directly opposite another long signal on the record film strip.

The disk is rotated at a speed calculated to show a time interval between the long and short signals, which said time interval may be of any desired time unit or fraction thereof and, obviously, will depend upon the speed of the motor driving the shaft 8 in relation to the diameter of the disk 17 as well as the contact time of contacts 24, 25 and 27 and 28 relative to electrodes 19 and 21. The width of the electrodes 21 and 19 may be quite narrow to produce merely a very short flash of light to be picked up by the photo finish camera.

Obviously, the top tubes of signal devices 2 and 3 may be synchronized to flash together to produce a short signal, or the bottom tubes of signal devices 2 and 3 may be synchronized to flash together, depending upon circumstances of installation and required or desired use.

A modification of the present invention is illustrated in Figs. 5, 6 and 7, and which said modification comprises single electrical illuminating tubes 51 and 52 disposed on opposite sides of the track in alignment with one another, the photo finish camera and the photo finish line. Spaced concentrically from each of the tubes 51 are shields, generally indicated at 53 and 54, respectively. With respect to shield 53, adjacent to the inner rail, the same is provided with a plurality of longitudinal, equally spaced, circumferential slits 55 and wherein twice as many slits are formed in the upper half of the shield 53 as are formed in the bottom half of the shield. The tube 52, provided with shield 54 disposed adjacent to the outer rail of the track, is provided with a plurality of longitudinal slits 56 and wherein twice as many longitudinal, equally spaced, circumferentially disposed slits are formed in the bottom half of the shield as are formed in the top half of said shield. The shields 55 and 56 are mounted upon shafts 58 connected to planetary gears 59 in mesh with gears 61 which, in turn, are driven by conventional Selsyn motors 62, connected electrically through lines, generally indicated at 63.

A motor of any suitable sort, provided it may be adjusted to a uniform speed, is indicated at 64 to drive the Selsyn motors. After the original adjustment of the shields 53 and 54 relative to one another and the photo finish camera and finish line, the said motor 64 is turned over at a uniform speed, which, in turn, serves to drive the motors 62 synchronously in order to turn the said shields 53 and 54 synchronously to produce simultaneously short flashes and long flashes of visible signals in the same manner as illustrated and described with reference to the signal devices 2 and 3 hereinbefore described.

Fig. 9 illustrates a strip of printed film 71 indicating placement of a line 72 thereupon to indicate the finish line. The line 72 is in alignment with long signal 73 appearing between the short signals 74. It is, therefore, quite clear that alignment of the hair line or finish line on a strip of film may be positioned properly at right angles to the edges of the film and, therefore, at right angles to longitudinal axis of the straightaway of the track at the point of race completion by means of the calibrations 73 and 74 appearing opposite one another adjacent to opposite edges of the film strip from which the decision of contestant placement is determined.

A number of other uses for the calibrated film record herein described may be found useful, as, for example, in industrial time surveys and particularly efficiency records necessary to determine the economy or relative efficiency of conveyor belts and other production line activities associated with industrial plants.

It is to be understood that the terms "contestant" or "contestants," "course," "track," or the like, used herein and in the claims is to include all objects, animate or inanimate, crossing a given locale on a course, whether on a track, belt, or otherwise. Similarly, reference to terms peculiar to racing, such as "rails" is to be understood to include other boundaries than rails or other pathways, courses, conveyor belts or other designated places of movement, as the case may be.

As heretofore mentioned, it is possible for the photo finish camera operator positively to align the camera with the exact finish line on the track by sighting the slit of the camera with the visually discernible signals emanating from the signal devices positioned on opposite sides of the track.

While the invention has been described in rather specific detail with reference to races and the sequential position of contestants across a given locale or line in races, and while the invention has been described with particular emphasis with respect to apparatus herein illustrated, it is to be understood that various changes in use and purpose and in the apparatus and method to carry out the invention may be practiced within the spirit of this invention and scope of the appended claims.

I claim:

1. A device for use in conjunction with a continuously moving, strip-type camera in making a photographic record of contestants passing a given line upon a race course, said camera being aligned on said given line, comprising a first light adjacent one end of said given line and in vertical alignment with said given line, a second light adjacent the opposite end of said given line and in vertical alignment with said given line, and means operable for simultaneously exposing both of said lights at successive brief intervals to the field of view of said camera.

2. A device for use in conjunction with a continuously moving, strip-type camera in making a photographic record of contestants passing a given line upon a race course, said camera being aligned on said given line, comprising a first light adjacent one end of said given line and in vertical alignment with said given line, a second light adjacent the opposite end of said given line and in vertical alignment with said given line, and means operable to simultaneously illuminate each of said lights for a brief interval, said lights being disposed within the field of view of said camera and so that their images will be disposed adjacent opposite edges of the film in said camera.

3. A device for use in conjunction with a continuously moving, strip-type camera in making a photographic record of contestants passing a given line upon a race course, said camera being aligned on said given line, comprising a first light adjacent one end of said given line and in vertical alignment with said given line, a second light adjacent the opposite end of said given line and in vertical alignment with said given line, and means operable to simultaneously illuminate each of said lights for a brief interval, said lights being disposed within the field of view of said camera and so that their images will be disposed adjacent opposite edges of the film in said camera, said lights arranged to produce simultaneous alternate long and short images.

4. A method of photographically proving the order of passage of contestants past a given line comprising continuously moving a strip of film through a camera having a slotted aperture aligned on said given line and positioned above and to one side of said given line, continuously exposing on said film the images of contestants as they pass said given line, simultaneously instantaneously exposing two lights to the field of view of said camera, one of said lights being located adjacent each end of said given line and each of said lights being in vertical alignment with said given line and exposing the images of said lights adjacent opposite edges of said film, developing said film, erecting a reference line connecting a coordinate pair of images of said lights, and establishing a finish line parallel to said reference line and tangent to the leading portion of the image of one of the contestants.

5. A method of photographically proving the order of passage of contestants past a given line comprising continuously moving a strip of film through a camera having a slotted aperture aligned on said given line and positioned above and to one side of said given line, continuously exposing on said film the images of contestants as they pass said given line, simultaneously instantaneously exposing two lights to the field of view of said camera, one of said lights being located adjacent each end of said given line and each of said lights being in vertical alignment with said given line and exposing the images of said lights adjacent opposite edges of said film, developing said film, and constructing a determinative line on said film tangent to the leading portion of the images of the leading contestant utilizing aligned pairs of images of said lights on opposite sides of the film strip to assure accurate construction of said determinative line.

References Cited in the file of this patent

UNITED STATES PATENTS

| | | | |
|---|---|---|---|
| 516,278 | Petri | Mar. 13, 1894 |
| 621,314 | Barber | Mar. 21, 1899 |
| 2,257,100 | Belock | Sept. 30, 1941 |
| 2,320,350 | Del Riccio | June 1, 1943 |
| 2,403,911 | Crowley | July 16, 1946 |
| 2,430,975 | Crowley | Nov. 18, 1947 |
| 2,443,572 | Allen | June 15, 1948 |
| 2,482,621 | Jones | Sept. 20, 1949 |